US012602254B2

(12) United States Patent
Zavesky et al.

(10) Patent No.: US 12,602,254 B2
(45) Date of Patent: Apr. 14, 2026

(54) JOB NEGOTIATION FOR WORKFLOW AUTOMATION TASKS

(71) Applicant: AT&T Intellectual Property I, L.P., Atlanta, GA (US)

(72) Inventors: Eric Zavesky, Austin, TX (US); Louis Alexander, Franklin, NJ (US); Aritra Guha, Edison, NJ (US); Wen-Ling Hsu, Bridgewater, NJ (US); Tan Xu, Bridgewater, NJ (US); Jean-Francois Paiement, Palm Desert, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 595 days.

(21) Appl. No.: 18/152,754

(22) Filed: Jan. 10, 2023

(65) Prior Publication Data

US 2024/0231929 A1      Jul. 11, 2024

(51) Int. Cl.
G06F 9/50 (2006.01)

(52) U.S. Cl.
CPC ................................. G06F 9/5038 (2013.01)

(58) Field of Classification Search
CPC ..................................................... G06F 9/5038
See application file for complete search history.

(56) References Cited

U.S. PATENT DOCUMENTS

| | | | |
|---|---|---|---|
| 2015/0112945 A1 | 4/2015 | Frankhauser et al. | |
| 2017/0192778 A1* | 7/2017 | Srivastava | G06F 16/285 |
| 2020/0242524 A1* | 7/2020 | Soundararajan | G06K 7/10366 |
| 2023/0037392 A1* | 2/2023 | Matsuoka | G06Q 10/109 |
| 2023/0041255 A1* | 2/2023 | Matsuoka | G06Q 10/063116 |
| 2023/0409997 A1* | 12/2023 | Yin | G06Q 10/063112 |
| 2024/0112122 A1* | 4/2024 | Khan | G06Q 10/06398 |

* cited by examiner

*Primary Examiner* — Sisley N Kim

(57) ABSTRACT

Devices, non-transitory computer-readable media, and methods for job negotiation for workflow automation tasks are disclosed. An example method includes receiving a delegation of a task from a controller, wherein the task is one of a plurality of tasks that collectively forms a workflow, assessing an ability of the processing system to perform the task as defined in the delegation, suggesting a modification to the task as defined in the delegation, determining whether the modification was accepted by the controller, and declining the task when the modification is not accepted by the controller, and performing the task including the modification when the modification is accepted by the controller.

20 Claims, 4 Drawing Sheets

200

300

400

JOB NEGOTIATION FOR WORKFLOW AUTOMATION TASKS

The present disclosure relates generally to workflow automation, and relates more particularly to devices, non-transitory computer-readable media, and methods for job negotiation for workflow automation tasks.

BACKGROUND

Workflow automation refers to the design, execution, and automation of processes based on workflow rules where human tasks, data, or files are routed between people or machines based on pre-defined rules. Many workflows are moving toward full automation in which machines will perform one hundred percent of the tasks.

SUMMARY

Devices, non-transitory computer-readable media, and methods for job negotiation for workflow automation tasks are disclosed. An example method includes receiving a delegation of a task from a controller, wherein the task is one of a plurality of tasks that collectively forms a workflow, assessing an ability of the processing system to perform the task as defined in the delegation, suggesting a modification to the task as defined in the delegation, determining whether the modification was accepted by the controller, and declining the task when the modification is not accepted by the controller, and performing the task including the modification when the modification is accepted by the controller.

In another example, a non-transitory computer-readable medium stores instructions which, when executed by a processing system including at least one processor, cause the processing system to perform operations. The operations include receiving a delegation of a task from a controller, wherein the task is one of a plurality of tasks that collectively forms a workflow, assessing an ability of the processing system to perform the task as defined in the delegation, suggesting a modification to the task as defined in the delegation, determining whether the modification was accepted by the controller, and declining the task when the modification is not accepted by the controller, and performing the task including the modification when the modification is accepted by the controller.

In another example, a device includes a processing system including at least one processor and a non-transitory computer-readable medium. The non-transitory computer-readable medium stores instructions which, when executed by the processing system, cause the processing system to perform operations. The operations include receiving a delegation of a task from a controller, wherein the task is one of a plurality of tasks that collectively forms a workflow, assessing an ability of the processing system to perform the task as defined in the delegation, suggesting a modification to the task as defined in the delegation, determining whether the modification was accepted by the controller, and declining the task when the modification is not accepted by the controller, and performing the task including the modification when the modification is accepted by the controller.

BRIEF DESCRIPTION OF THE DRAWINGS

The teachings of the present disclosure can be readily understood by considering the following detailed description in conjunction with the accompanying drawings, in which.

To facilitate understanding, similar reference numerals have been used, where possible, to designate elements that are common to the figures.

DETAILED DESCRIPTION

The present disclosure broadly discloses methods, computer-readable media, and systems for job negotiation for workflow automation tasks. As discussed above, many workflows, including surgical workflows, manufacturing workflows, and the like, are moving toward full automation in which machines will perform one hundred percent of the workflow tasks. Most computing systems use controller/ executor mechanisms to coordinate the activities of the machines; however, the computing system may lack knowledge about the capabilities, availabilities, optimal skillsets, current environments, and current statuses of the machines. For instance, a computing system may delegate a task to a machine that does not have the capability to perform the task, or that is currently being repaired and is unavailable for task delegation. This can create bottlenecks and delays in the workflow automation process.

Examples of the present disclosure provide a job negotiation function that allows machines in automated environments to exercise some level of control over what tasks the machines accept and when the machines are expected to perform the accepted tasks. For instance, if a machine is unable to perform a task that has been assigned to the machine, the machine may suggest modifications that would make it possible for the machine to perform the task or that might allow for better alignment with other (historical and/or concurrent) tasks. Alternatively, the machine may suggest an alternate machine to which the task might be reassigned. This allows workflow automation tasks to be carried out in a more optimal manner, accounting for the impact on local objectives as well as more global objectives. Moreover, the ability to negotiate task delegations allows for more complex interactions between the components (e.g., controllers and controlled machines) of an automated system); the controllers do not necessarily need to know all of the information about the capabilities, statuses, environments, and the like of the machines when delegating tasks, because the machines can communicate back to the controller when tasks are beyond their abilities.

This also allows for human operators and automated systems to develop sustainable future habits. For instance, a machine may be able to educate the human operators and/or automated system controller as to the long-term implications of assigned tasks, based on predictive modelling. Policies may be flexibly developed depending on environmental factors (e.g., economy, safety, etc.).

These and other aspects of the present disclosure are discussed in greater detail below in connection with the examples of FIGS. 1-4.

Figure 1:
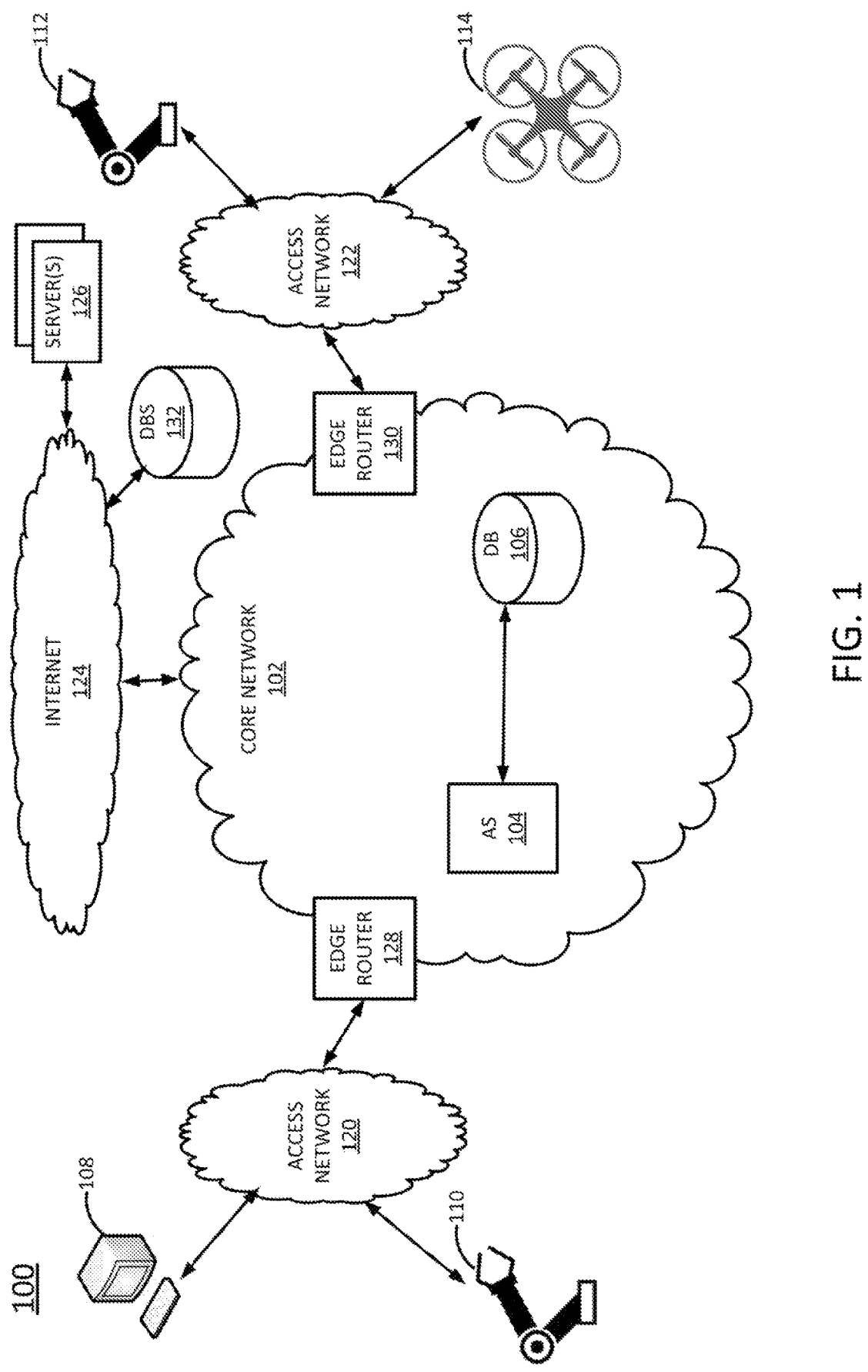
FIG. 1 illustrates an example system in which examples of the present disclosure for job negotiation for workflow automation tasks may operate.

To further aid in understanding the present disclosure, FIG. 1 illustrates an example system 100 in which examples of the present disclosure for job negotiation for workflow automation tasks may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wired network, a wireless network, and/or a cellular network (e.g., 2G-5G, a long term evolution (LTE) network, and the like) related to the current disclosure. It should be noted that an IP network is broadly defined as a network that uses Internet Protocol to exchange data packets. Additional example IP networks include Voice over IP (VOIP) networks, Service over IP (SoIP) networks, the World Wide Web, and the like.

In one example, the system 100 may comprise a core network 102. The core network 102 may be in communication with one or more access networks, such as access networks 120 and 122, and with the Internet 124. In one example, the core network 102 may functionally comprise a fixed mobile convergence (FMC) network, e.g., an IP Multimedia Subsystem (IMS) network. In addition, the core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. In one example, the core network 102 may include at least one application server (AS) 104, at least one database (DB) 106, and a plurality of edge routers 128-130. For ease of illustration, various additional elements of the core network 102 are omitted from FIG. 1.

In one example, the access networks 120 and 122 may comprise a Digital Subscriber Line (DSL) network, a public switched telephone network (PSTN) access network, a broadband cable access network, a Local Area Network (LAN), a wireless access network (e.g., an IEEE 802.11/ Wi-Fi network and the like), a cellular access network, a $3^{rd}$ party network, and the like. For example, the operator of the core network 102 may provide a cable television service, an IPTV service, media streaming service, or any other types of communication services to subscribers via access network 120 or access network 122. In one example, the core network 102 may be operated by a telecommunication network service provider. The core network 102 and the access networks 120 and 122 may be operated by different service providers, the same service provider or a combination thereof, or the access networks 120 and 122 may be operated by an entity having a core business that is not related to telecommunications services, e.g., corporate, governmental, or educational institution LANs, and the like.

In one example, the access network 120 may be in communication with one or more machines 108 and 110. The access network 120 may transmit and receive communications between the machines 108 and 110, between the machines 108 and 110 and the server(s) 126, the AS 104, other components of the core network 102, devices reachable via the Internet in general, and so forth. Similarly, the access network 122 may be in communication with one or more machines 112 and 114. The access network 122 may transmit and receive communications between the machines 112 and 114, between the machines 112 and 114 and the server(s) 126, the AS 104, other components of the core network 102, devices reachable via the Internet in general, and so forth.

In one example, each of the machines 108-114 may comprise any single device or combination of devices that is capable of being controlled via a network to carry out a task that is part of a workflow (e.g., in an autonomous manner with little to no human assistance). For example, any of the machines 108-114 may comprise a mobile device, a cellular smart phone, a gaming console, a set top box, a laptop computer, a tablet computer, a desktop computer, an Internet of Things (IOT) device, a wearable smart device (e.g., a smart watch, a fitness tracker, a head mounted display, or Internet-connected glasses), a drone or autonomous vehicle, an application server, a bank or cluster of such devices, and the like. Any of the machines 108-114 may also comprise a special-purpose robot or machine (e.g., with one or more arms or assemblies) that is configured to perform a limited number of physical tasks as opposed to computing or processing tasks. For instance, the machines 108-114 may comprise robots or robotic systems with operating mechanical assemblies, e.g., clutching assembly, cutting assembly, carrying assembly, moving assembly such as wheels or tracks, a dial index machine, an in-line machine, a floating work platform machine, a continuous motion machine, a conveyor, a lathe, an extrusion device, a robot programmed to apply paint and coatings, a drill, or the like that are programmed to perform tasks of workflows for performing surgery, for assembling goods on an assembly line, or the like. To this end, the machines 108-114 may comprise one or more physical devices, e.g., one or more computing systems or servers, such as computing system 400 depicted in FIG. 4 with operating mechanical assemblies, and may be configured as described below.

In one example, at least some of the machines 108-114 may be operated by a respective human user. In another example, one or more of the machines 108-114 may comprise an Internet of Things device or a similar device that is not necessarily directly operated by a human user, but that may monitor the status of a human user. For instance, any of the machines 108-114 may include smart security systems that may capture video and/or audio of human users, smart thermostats that may monitor the temperature in spaces where human users are working, smart lighting systems that may monitor the brightness of the lighting in spaces where human users are working, and the like. Such systems may ensure the safety of any individuals who may be present in the environments where the machines 108-114 are performing workflow tasks.

In one example, one or more servers 126 may be accessible to the machines 108-114 via the Internet 124 in general. The server(s) 126 may operate in a manner similar to the AS 104, which is described in further detail below.

In accordance with the present disclosure, the AS 104 and DB 106 may be configured to provide one or more operations or functions in connection with examples of the present disclosure for job negotiation for workflow automation tasks, as described herein. For instance, the AS 104 may be configured to operate as a centralized controller or artificial intelligence (AI) which may decompose a workflow to be performed into a plurality of tasks which collectively achieve a global objective of the workflow when performed. The AS 104 may further delegate tasks of the workflow among the machines 108-114 and may communicate information to the machines 108-114 to allow the machines 108-114 to perform the delegated tasks.

To this end, the AS 104 may comprise one or more physical devices, e.g., one or more computing systems or servers, such as computing system 400 depicted in FIG. 4, and may be configured as described below. In some examples, the AS 104 may comprise an AI system that may be integrated with other AI systems (potentially located in a workspace of the machines 108-114) into a single AI system.

The AS 104 may have access to at least one database (DB) 106, where the DB 106 may store information related to a plurality of workflows. In one example, the workflows stored in the DB 106 may be specific to a particular enterprise. For instance, if the enterprise is an automobile manufacturer, the workflows may include workflows for assembling different parts of different models of automobiles with machine or robotic assistance (e.g., installing front and rear suspensions, gas tanks, rear axles and drive shafts, gear boxes, steering box components, wheel drums, braking systems, and the like in the chassis). If the enterprise is a hospital, the workflows may include workflows for different surgeries that may be performed with machine or robotic assistance (e.g., performing a hip replacement, a gallbladder removal, a coronary artery bypass, etc.).

In another example, the DB 106 may store profiles for machines (e.g., machines 108-114) which are controllable by the AS 104 to perform tasks of workflows. For instance, for a machine, a profile may specify the machine's capabilities, limitations, previous workflows in which the machine has participated, and the like. Knowing this information may help the AS 104 to delegate tasks of a workflow among the machines in an intelligent manner that considers the optimal use of resources.

In one example, DB 106 may comprise a physical storage device integrated with the AS 104 (e.g., a database server or a file server), or attached or coupled to the AS 104, in accordance with the present disclosure. In one example, the AS 104 may load instructions into a memory, or one or more distributed memory units, and execute the instructions for job negotiation for workflow automation tasks, as described herein. One example method for job negotiation for workflow automation tasks is described in greater detail below in connection with FIG. 2. Another method for job negotiation for workflow automation tasks is described in greater detail below in connection with FIG. 3.

In one example of the present disclosure, the machines 108-114 may be configured to negotiate with the AS 104 in order to optimize delegation of tasks of the workflow. For instance, the AS 104 may delegate a first task to the machine 110 and specify that the first task must be completed within two hours of being delegated. The first task may be estimated to take one hour to perform. However, the machine 110 may currently be performing a second task of another workflow that is not expected to be completed for another ninety minutes; thus, assuming the machine 110 cannot perform the first and second tasks concurrently, the machine 110 will not be able to complete the first task within the specified two hour time period. In this case, the machine 110 may negotiate the delegation of the first task with the AS 104.

In one example, the negotiation may include proposing a modification to the parameters or conditions of the first task. For instance, the first machine 110 may ask for more time to complete the first task (e.g., can the first task be completed within three hours of being delegated, rather than two hours?). In another example, the negotiation may include proposing that the first task be redelegated to an alternate machine that is capable of performing the task. For instance, the first machine 110 may propose that the first task be redelegated to the machine 112, which is of a similar type, make, and/or model.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

It should be noted that the system 100 has been simplified. Thus, those skilled in the art will realize that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, media streaming server, a content distribution network (CDN) and the like. For example, portions of the core network 102, access networks 120 and 122, and/or Internet 124 may comprise a content distribution network (CDN) having ingest servers, edge servers, and the like. Similarly, although only two access networks 120 and 122 are shown, in other examples, the access networks 120 and 122 may comprise a plurality of different access networks that may interface with the core network 102 independently or in a chained manner. For example, machines 108-114 may communicate with the core network 102 via different access networks. Thus, these and other modifications are all contemplated within the scope of the present disclosure.

Figure 2:
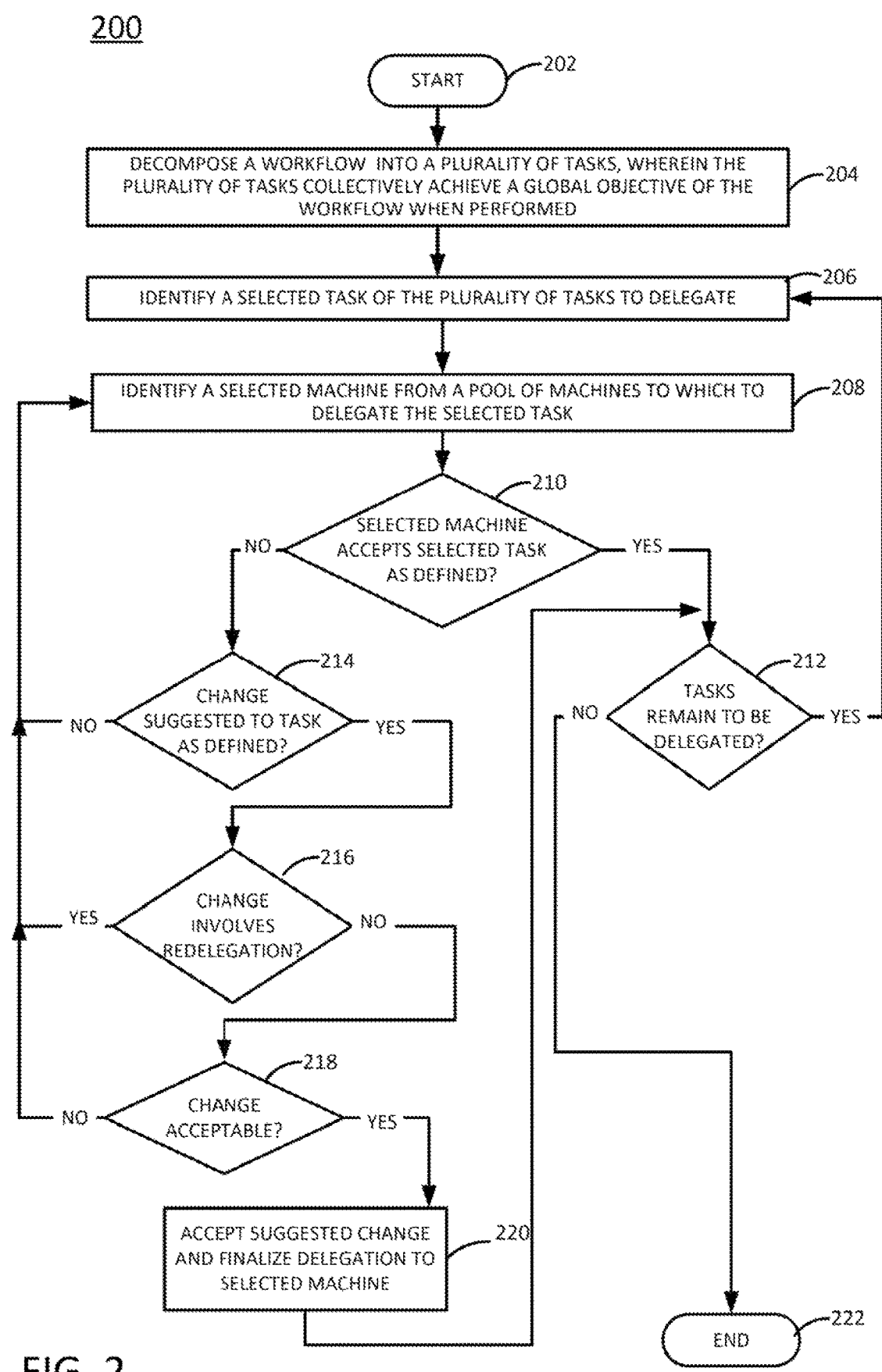
FIG. 2 illustrates a flowchart of an example method for job negotiation for workflow automation tasks, in accordance with the present disclosure.

FIG. 2 illustrates a flowchart of an example method 200 for job negotiation for workflow automation tasks, in accordance with the present disclosure. In particular, FIG. 2 illustrates a method by which a centralized controller may negotiate with a machine to delegate a task of a workflow automation job. Thus, in one example, steps, functions and/or operations of the method 200 may be performed by a device as illustrated in FIG. 1, e.g., AS 104 or any one or more components thereof. In another example, the steps, functions, or operations of method 200 may be performed by a computing device or system 400, and/or a processing system 402 as described in connection with FIG. 4 below. For instance, the computing device 400 may represent at least a portion of the AS 104 in accordance with the present disclosure. For illustrative purposes, the method 200 is described in greater detail below in connection with an example performed by a processing system, such as processing system 402.

The method 200 begins in step 202 and proceeds to step 204. In step 204, the processing system may decompose a workflow into a plurality of tasks, wherein the plurality of tasks collectively achieve a global objective of the workflow when performed.

In one example, the workflow may comprise a workflow that is fully automated (e.g., performed entirely by one or more machines whose actions are coordinated by a centralized controller) or partially automated (e.g., by one or more machines and one or more human operators acting in a coordinated fashion).

In one example, the processing system may identify the workflow that is being performed. In one example, identifying the workflow may involve detecting a signal that is provided by a machine or by a human operator (e.g., via a user endpoint device) that identifies the workflow to be performed. For instance, the human or the machine may select a workflow from among a plurality of stored (e.g., predefined) workflows to which the processing system has access. As an example, if an enterprise is an automobile manufacturer, the workflows that are stored for the enterprise may include workflows for assembling different parts of different models of automobiles with machine or robotic assistance (e.g., installing front and rear suspensions, gas tanks, rear axles and drive shafts, gear boxes, steering box components, wheel drums, braking systems, and the like in the chassis). If the enterprise is a hospital, the workflows may include workflows for different surgeries that may be performed with machine or robotic assistance (e.g., performing a hip replacement, a gallbladder removal, a coronary artery bypass, etc.). Each stored workflow may include a set of predefined tasks to be performed in order to complete the workflow and an order in which the individual tasks of the set of predefined tasks are to be performed. Each individual task may also be associated with one or more recommended machines for carrying out the individual task.

In another example, identifying the workflow may involve analyzing sensor inputs in order to identify the workflow to be performed. For instance, the processing system may perform audio analysis of an audio signal captured by a microphone, where the audio analysis may include using speech recognition to recognize an utterance in which a keyword is spoken. The keyword may be the name of the workflow to be performed or may be related to the workflow to be performed. For instance, a keyword such as "hip" or "prosthetic" could be associated with a workflow for a hip replacement surgery. In another example, the processing system may perform image analysis of one or more images captured by a camera, where the image analysis may include using object recognition techniques to recognize an object that is visible in the images. The object may be related to the workflow to be performed. For instance, if a component of a prosthetic hip is detected in an image, this may indicate that the workflow to be performed comprises a hip replacement surgery. In other examples, other types of processing of other types of sensor data may be utilized to identify the workflow, e.g., scanning of a bar code or a quick response (QR) code by the human or machine in handling one or more objects.

As discussed above, in one example, the workflow may comprise a predefined workflow that is stored in a database. In this case, the tasks that must be performed to complete the workflow, and the order of the tasks, may also be predefined. In other words, a template for the workflow may be accessible to the processing system. The templates may be specific to a given enterprise or individual, or may comprise publicly available templates that are crowdsourced or shared among multiple enterprises or individuals. However, in another example, the workflow that is detected may not be stored, and the processing system may consult one or more external data sources (e.g., a remote database, the Internet, etc.) in order to determine the tasks and the order of the tasks.

In one example, a stored workflow may contain one or more tasks that may be proprietary to a specific enterprise or individual (e.g., a trade secret such as a soft drink recipe). In such cases, if the machine(s) (and/or human operators) do not have authorization to access the proprietary information, then the processing system may modify the workflow by genericizing, omitting, or otherwise altering the proprietary tasks. Furthermore, location-related context may necessitate other modifications to the workflow by the processing system. For instance, depending on the location (e.g., country or state) in which the workflow is to be performed, local laws may prohibit certain tasks (e.g., the use of paint containing certain ingredients, such as lead, in threshold quantities). Similarly, depending on the location, it may be appropriate to convert units of measure from one system to another (e.g., converting units of measure that are specified using the metric system to imperial units of measure for a workflow to be performed in the United States).

In step 206, the processing system may identify a selected task (e.g., a first task) of the plurality of tasks to delegate. For instance, in one example, the processing system may generate a list of the plurality of tasks. The processing system may select tasks from the list one-by-one, or may select multiple tasks at once (e.g., if there are dependencies between the multiple tasks or other circumstances that might make it more efficient to delegate multiple tasks at once). The processing system may select the tasks in the order the tasks are to be performed, or may select tasks out of order (e.g., again, if there are dependencies or other circumstances that would make such an approach more efficient).

In step 208, the processing system may identify a selected machine (e.g., a first machine) from among a pool of machines to which to delegate the selected task. In one example, the processing system may have access to a pool of machines (e.g., robots). Different machines in the pool of machines may have different capabilities, resources, and the like. Thus, different machines in the pool of machines may be suited to perform different types of tasks. In one example, the capabilities of the machines may be determined by first identifying each machine, and then retrieving a profile for the machine that corresponds to the identity. For instance, a machine may be associated with a unique identifier (e.g., IP address, media access control address, subscriber identification module card, or the like) that is detectable by the processing system through communication with the machine.

In another example, the processing system may utilize sensor data to infer the capabilities of the machines. For instance, the processing system may perform image recognition on an image of a machine to identify a make and model of the machine. The processing system may then look up the capabilities of the machine based on the make and model information, e.g., by consulting an external data source such as the Internet. Alternatively, the processing system may detect, based on analysis of an image of the machine, that the battery life of the machine is low (e.g., light emitting diode (LED) indicators on the machine may indicate battery life) and that the machine may only be available to assist for a limited period of time. In other examples, the processing system may infer the capabilities of the machine from other types of sensor data.

In one example, the tasks may be delegated based at least in part on the workflow that is identified and the capabilities that are determined. For instance, as discussed above, identifying the workflow may include identifying a template that specifies a set of tasks to be performed and an order in which to perform the sets of tasks. Based on the capabilities that were determined for the machines in the pool of machines, the processing system may then determine which of the tasks which machines are capable of performing or are best suited to perform. In some cases, more than one machine may be capable of performing a given task, but it may be more efficient or more cost effective to delegate the task to one machine rather than the other. In one example, if a template for the workflow is available, metadata associated with the template may indicate, for at least some of the tasks, a recommended machine to which to delegate the tasks. For instance, based on observations of previous performances of the workflow, an optimal delegation of tasks may already be known.

As an example, a workflow for performing a surgery may indicate that the patient's blood loss should be monitored during the surgery, that specific incisions are to be made, and that the surgeon will require specific instruments to perform the surgery. The task of monitoring blood loss may be delegated to a first machine. The task of acquiring the necessary instruments may be delegated to a second machine. Some of the incisions may be delegated to a human surgeon, while other incisions may be delegated to a machine which may be better equipped to perform the incisions with high precision when needed.

In one example, all delegations of tasks for a workflow may be stored in a single block chain. For instance, the block chain may store, for each task, a description of the task, a signal input on which the task may be based (e.g., perform the task in response to detecting an occurrence of a specific trigger), a machine to which the task has been delegated, what time the task is expected to be performed, a location at which the task is expected to be performed, and/or other information.

In one example, identifying a selected machine to which to delegate the selected task may involve sending a signal to the selected machine, where the signal identifies the selected task and any conditions for performing the selected task (e.g., time by which the selected task must be completed, maximum acceptable duration for the selected task, other tasks on which the selected task depends or other tasks that depend on the selected task, and/or the like). Thus, the signal may inform the selected machine of the selected tasks that have been respectively delegated to the selected machine. In one example, the processing system may send the signal directly to the selected machine (e.g., via wired or wireless communications). For instance, the signal may comprise a machine readable signal or code that can be translated into an action by the selected machine.

In step 210, the processing system may determine whether the selected machine has accepted the selected task as defined. In one example, the selected machine may have control over whether the selected machine will perform the selected task, as defined by the processing system. That is, the selected machine will not automatically accept responsibility for the selected task just because the processing system has delegated the selected task to it. In one example, the selected machine may accept the selected task exactly as defined by the processing system. In another example, the selected machine may decline the selected task. In yet another example, the selected machine may accept the selected task, with the condition that the processing system accept certain modifications. For instance, the selected machine may be capable of performing the selected task, but may not be able to start the selected task until after a time specified by the processing system (e.g., due to the selected machine performing another task that will not be completed until after the time specified by the processing system). Thus, the selected machine may propose that the selected task may be performed at a later time than the time initially specified by the processing system.

If the processing system determines in step 210 that the selected machine has accepted the selected task as defined, then the method 200 may proceed to step 212. In step 212, the processing system may determine whether any tasks of the workflow remain to be delegated.

For instance, as discussed above, in one example, the selected machine may accept the selected task outright, exactly as defined by the processing system. In this case, the processing system may consider the selected task successfully delegated and may move on to delegate another (e.g., second) task of the plurality of tasks.

If the processing system concludes in step 212 that tasks of the workflow remain to be delegated, then the method 200 may return to step 206 and may proceed as discussed above to identify another selected task (e.g., a second task) of the plurality of tasks to delegate. If, however, the processing system concludes in step 212 that no tasks of the workflow remain to be delegated, then the method 200 may end in step 222.

Referring back to step 210, if the processing system concludes that the selected machine has not accepted the selected task as defined, then the method 200 may proceed to step 214. Step 214 may represent the start of a negotiation between the processing system and the selected machine.

In step 214, the processing system may determine whether the selected machine has proposed a change to the selected task as defined. For instance, as discussed above, the selected machine may accept the selected task, with the condition that the processing system accept certain modifications. For instance, the selected machine may be capable of performing the selected task, but may not be able to start the selected task until after a time specified by the processing system (e.g., due to the selected machine performing another task that will not be completed until after the time specified by the processing system). Thus, the selected machine may propose that the selected task may be performed at a later time than the time initially specified by the processing system.

If the processing system concludes in step 214 that the selected machine has not proposed a change to the selected task as defined (e.g., the selected machine has simply declined the selected task), then the method 200 may return to step 208 and may proceed as described above to identify a selected machine (e.g., a second machine) from among the pool of machines to which to redelegate the selected task.

For instance, as discussed above, the selected machine may be one machine in a pool of machines controllable by the processing system. Thus, if a first selected machine from the pool declines to accept a selected task, the processing system may identify a different, second selected machine from the pool to which to redelegate the selected task.

If, however, the processing system concludes in step 214 that the selected machine has proposed a change to the selected task as defined, then the processing system may proceed to step 216. In step 216, the processing system may determine whether the change proposed by the selected machine involves a redelegation of the selected task as defined.

For instance, if the selected machine has not declined the selected task outright and has not proposed changes to the selected task as defined, then it may be assumed that the selected machine has proposed a change of a different nature. As an example, the selected machine may have knowledge of other machines that may be capable of performing the selected task. For instance, the pool of machines may include several machines of the same type, make, and/or model (e.g., several gas chromatographs). The several machines may be arranged in a load balancing arrangement, or may at least be communicatively coupled to share information about respective workloads. In such a case, the selected machine may be able to suggest an alternate machine that may be better suited to perform the selected task as defined.

If the processing system concludes in step 216 that the change proposed by the selected machine involves a redelegation of the selected task as defined, then the method 200 may return to step 208 and may proceed as described above to identify a selected machine (e.g., a second machine) from among the pool of machines to which to redelegate the selected task.

In one example, the machine to which the selected task is redelegated (e.g., the second machine) is the machine that is suggested by the selected machine (e.g., the first machine) to which the selected task was initially delegated. However, in another example, the processing system may identify a different machine, other than the machine identified by the selected machine, to which to redelegate the task. In this case, the processing system may identify the different machine in any of the same ways that the processing system may have identified the initially selected machine.

If, however, the processing system concludes in step 216 that the change proposed by the selected machine does not involve a redelegation of the selected task as defined (e.g., the change proposed is a change to the definition of the selected task), then the method 200 may proceed to step 218. In step 218, the processing system may determine whether the change proposed by the selected machine is acceptable.

For instance, the processing system may determine whether the change proposed by the selected machine, if accepted, would still allow the workflow to be completed in a manner consistent with any conditions imposed on the workflow. As an example, the workflow may need to be completed by a specific time. If the selected machine cannot start the selected task immediately, but instead proposes delaying the start of the selected task, the processing system may need to determine whether the workflow can still be completed by the specific time if the delay is factored in. In another example, the proposed change may include changes to security protocols for handling data, and the processing system may need to determine whether the changes to the security protocols might violate any requirements for handling the data.

If the processing system concludes in step 218 that the change proposed by the selected machine is not acceptable, then the method 200 may return to step 208 and may proceed as described above to identify a selected machine (e.g., a second machine) from among the pool of machines to which to redelegate the selected task.

If, however, the processing system concludes in step 218 that the change proposed by the selected machine is acceptable, then the method 200 may proceed to step 220. In step 220, the processing system may accept the proposed change and finalize the delegation of the selected task to the selected machine. The method 200 may then return to step 212 and may proceed as described above to determine whether any tasks of the workflow remain to be delegated.

In some examples, the processing system may communicate with a human operator (e.g., via a user interface or UI) to inform the human operator of task delegations, workflow progress, and the like. For instance, the processing system may control a UI to display the plurality of tasks in the workflow, as well as which tasks may have yet to be reassigned. The UI may show which machines have been assigned to perform which tasks, as well as which tasks are completed, are in progress, and/or have yet to start. The UI may also show which tasks have been modified and/or reassigned based on feedback from the machines.

Figure 3:
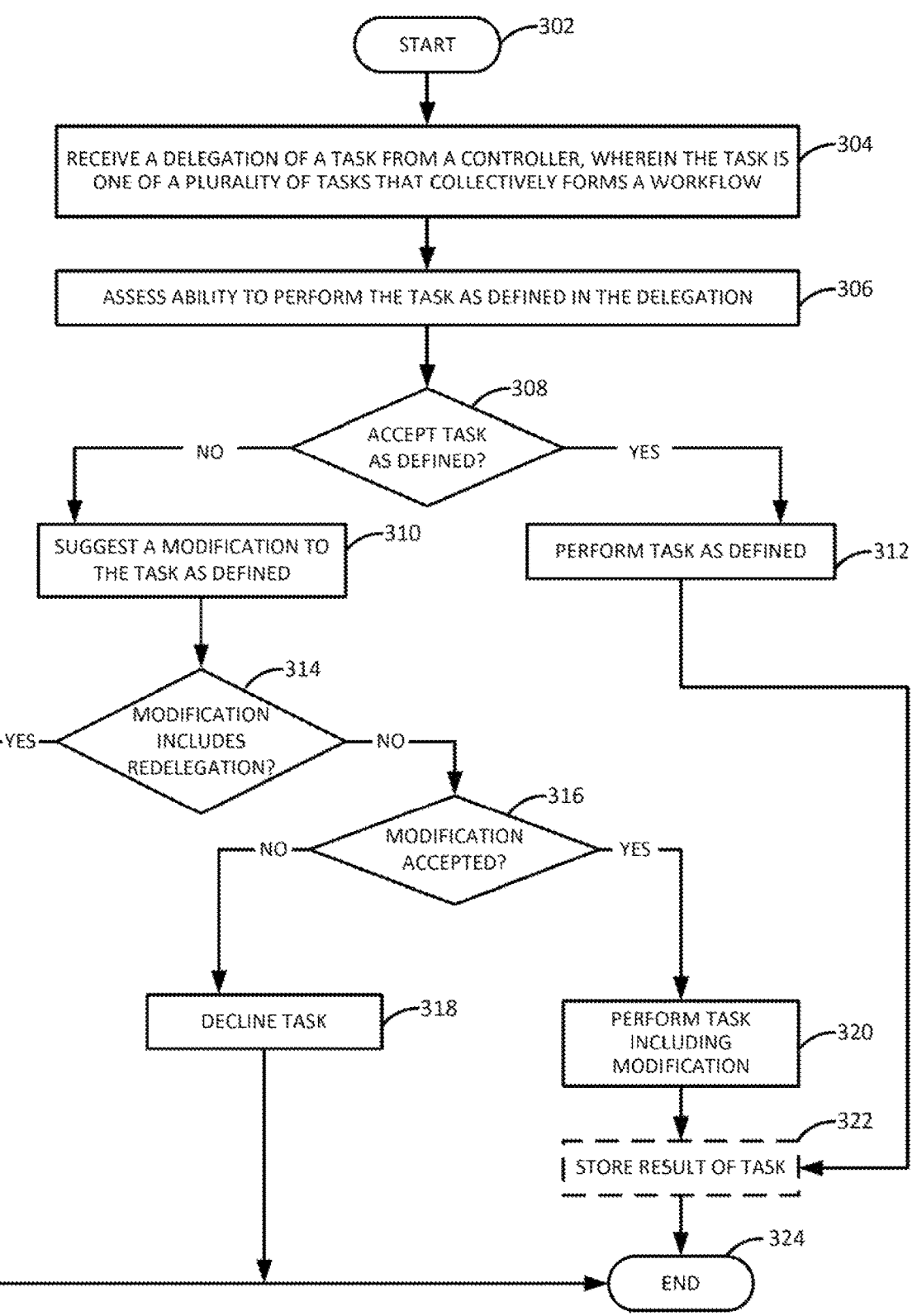
FIG. 3 illustrates a flowchart of an example method for job negotiation for workflow automation tasks, in accordance with the present disclosure.

FIG. 3 illustrates a flowchart of an example method 300 for job negotiation for workflow automation tasks, in accordance with the present disclosure. In particular, FIG. 3 illustrates a method by which a machine assigned to a selected task of a workflow automation job delegated by a centralized controller may negotiate with the controller to delegate a task of a workflow automation job. Thus, in one example, steps, functions and/or operations of the method 300 may be performed by a device as illustrated in FIG. 1, e.g., one of the machines 108-114 or any one or more components thereof. In another example, the steps, functions, or operations of method 300 may be performed by a computing device or system 400, and/or a processing system 402 as described in connection with FIG. 4 below. For instance, the computing device 400 may represent at least a portion of one of the machines 108-114 in accordance with the present disclosure. For illustrative purposes, the method 300 is described in greater detail below in connection with an example performed by a processing system, such as processing system 402.

The method 300 may begin in step 302 and proceed to step 304. In step 304, the processing system may receive a delegation of a task from a controller, wherein the task is one of a plurality of tasks that collectively forms a workflow.

For instance, as discussed above, the workflow may comprise a workflow that is fully automated (e.g., performed entirely by one or more machines whose actions are coordinated by a centralized controller) or partially automated (e.g., by one or more machines and one or more human operators acting in a coordinated fashion). The controller may have determined a set of tasks (which may or may not be predefined) to be performed in order to complete the workflow and an order in which the individual tasks of the set of predefined tasks are to be performed. The task that is delegated to the processing system in step 304 may be one of the tasks in such a set of tasks.

In step 306, the processing system may assess an ability of the processing system to perform the task as defined in the delegation. For instance, the processing system may determine whether it has the capability to perform the task as defined (e.g., whether it has access to the hardware and/or software needed to perform the task as defined). The processing system may also further determine whether it has the ability to perform the task as defined subject to any conditions imposed by the task as defined. For instance, the processing system may have access to the necessary hardware and software to perform the task, but that hardware and/or software may currently be in use performing another task; thus, if the conditions imposed require the task as defined to be performed within some threshold period of time, the processing system may need to determine whether the necessary hardware and/or software will be available to perform the task as defined within the threshold period of time.

In step 308, the processing system may determine whether to accept the task as defined in the delegation. In other words, the processing system may self-assess its suitability to perform the task as defined in the delegation. For instance, the processing system may determine that it can perform the task as defined and can therefore accept the task exactly as defined. Alternatively, the processing system may determine that it does not have the necessary capabilities to perform the task as defined. In another example, as discussed above, the processing system may be able to perform the task, but only if certain modifications are made to particular conditions imposed on performance of the task (e.g., cannot perform the task as defined, but could perform a modified definition of the task). In another example, the processing system may have the necessary capabilities to perform the task as defined, but other circumstances such as environment or status may prevent the processing system from accepting the task as defined. For instance, the processing system may be scheduled to go offline for routine maintenance during the time frame in which the task as defined needs to be performed.

In one example, the determination as to whether to accept the task as defined in the delegation may be made using a machine learning model. For instance, the processing system may employ a machine learning model that is trained to take as an input a proposed task and to generate as an output a likelihood that the processing system can perform the proposed task. The machine learning model may be trained using data about past tasks performed by the processing system.

In one example, the determination as to whether to accept the task as defined may be made in accordance with a risk/reward function. For instance, a risk associated with performing the task might relate to the resources that would need to be consumed to perform the task (and would, therefore, be temporarily unavailable to perform other tasks). Another risk may be an increased chance of hardware or software failure after completing a task, like reaching a physical tolerance of a mechanical component (e.g., due to excessive weight or wear, potential overheating, etc.) or uncertainty in a software-based decision (e.g., an error tolerance is too high for a decision to be deferred to a machine's decision function alone). A reward associated with performing a task might relate to an ability to increase use of underutilized resources of the processing system. A reward could also include access to some resource the processing system does not normally have access to (e.g., where the access may be granted by the controller or by another machine in the pool of machines). In other words, an opportunity cost may be associated with the acceptance of a task. Thus, a processing system may not automatically accept the task as defined just because the processing system is capable of performing the task as defined; the processing system may further perform some type of risk/reward analysis to determine whether it is beneficial (to the processing system, to the controller, to an automated system as a whole, or the like) for the processing system to perform the task as defined.

In a further example, the determination as to whether to accept the task as defined may be made in accordance with a dependency. For instance, as discussed above, some tasks may depend upon the completion of other tasks. As an example, if the input to a first task is the output of a second task, then the second task must generate its output before the first task can be performed. In some cases, the processing system may decline to perform the task as defined (even if the processing system is technically capable of performing the task as defined) if the processing system determines that some other task or data on which the task as defined depends has not yet been met.

In some examples, the manufacturer of the processing system may pre-program the processing system to decline tasks of certain types (or tasks that are subject to certain types of conditions).

If the processing system concludes in step 308 that the task as defined in the delegation should be accepted, then the method 300 may proceed to step 312. In step 312, the processing system may perform the task as defined.

After performing the task as defined, the method 300 may proceed to step 322. In optional step 322 (illustrated in phantom), the processing system may store the results of performing the task, before ending in step 324.

For instance, the processing system may store a result of the performing the task in a centralized database that can be accessed by the processing system and/or other machines that may be performing other tasks of the plurality of tasks. This may allow the controller to track the progress of the workflow and to make any adjustments as needed (e.g., to redelegate one or more tasks, to reorder or repeat one or more tasks, to adjust an expected timeframe for completion of the workflow, etc.).

In one example, when a future or subsequent task is defined (as part of the same or a future workflow), and that future task is similar to the task that was performed in step 312, the results of performing the task performed in step 312 may be used to generate a simulation that may show the probable outcome of performing the future task. In other words, storing the results of the task may allow the processing system, the controller, and/or other machines in the pool of machines, to make determinations as to delegations of future tasks and whether to accept, decline, or propose modifications to future tasks. Thus, the results of performing the task may help the controller, the processing system, and other machines in the pool of machines to better understand the capabilities and limitations of the different machines in the pool and to better optimize delegations of tasks.

Alternatively, if the processing system concludes in step 308 that the task as defined in the delegation should not be accepted, then the method 300 may proceed to step 310. In step 310, the processing system may suggest a modification to the task as defined in the delegation.

For instance, as discussed above, the processing system may determine that it cannot perform the task as defined, but could perform a modified definition of the task (e.g., perform the task on a different timeframe, change a dependency related to the task, change a processing parameter of the task such as a temperature at which the task is performed, a speed at which the task is performed, or the like, change an order in which the task is performed relative to other tasks concurrently being performed by the processing system, perform the task if a greater reward is offered, or perform another modified version of the task).

In step 314, the processing system may determine whether the modification includes a suggested redelegation of the task as defined to another machine. For instance, the suggested modification may comprise a suggestion to redelegate the task to a different processing system or machine. As an example, the pool of machines may include several machines of the same type, make, and/or model as the processing system or machine of which the processing system is a part (e.g., several gas chromatographs). The several machines may be arranged in a load balancing arrangement, or may at least be communicatively coupled to share information about respective workloads. In such a case, the processing system may be able to suggest an alternate processing system machine that may be better suited to perform the selected task as defined.

If the processing system concludes in step 314 that the modification does include a suggested redelegation of the task as defined to another machine, then the method 300 may end in step 324. For instance, if the suggested modification comprises a redelegation of the task as defined, then this may imply that the processing system has declined the task as defined. As such, the processing system may be considered to have no further role in performing the workflow (unless and until a delegation of another is received).

Alternatively, if the processing system concludes in step 314 that the modification does not include a suggested redelegation of the task as defined to another machine (e.g., only includes modifications to the actual task), then the method 300 may proceed to step 316. In step 316, the processing system may determine whether the modification was accepted by the controller.

As discussed above, when the processing system proposes a modification to the task as defined, the controller may determine whether to accept the proposed modification (e.g., allow the processing system to proceed with performing the task, subject to the proposed modification) or whether to simply redelegate the task as defined (e.g., without modification) to a different processing system or machine.

If the processing system concludes in step 316 that the modification was not accepted by the controller, then the method 300 may decline the task in step 318 before ending in step 324. For instance, the processing system may be unable to perform the task as defined (e.g., subject to any conditions imposed). However, the controller may determine that any proposed modifications to the task that are suggested by the processing system cannot be accepted. For instance, if the proposed modifications are accepted, the workflow as a whole may not be completed by a required time. In this case, the processing system may notify the controller that the task as defined must be declined.

Alternatively, if the processing system concludes in step 316 that the modification was accepted by the controller, then the method 300 may proceed to step 320. In step 320, the processing system may perform the task including the modification.

In one example, the modification may include further modifications than what was originally proposed by the processing system. For instance, steps 310-316 may involve a negotiation between the processing system and the controller. The controller may not immediately accept a proposed modification to the task as defined, but may counter with further proposed modifications (e.g., increased rewards to perform the task as defined without the modification, a less drastic version of the modification, indemnification for damages incurred in performing the task as defined, performing only a portion of the task as defined, or the like). Modifications may be negotiated to optimize the overall workflow for time, cost, and/or other factors.

Once the task has been performed (including the modification), the method 300 may proceed to optional step 322 (illustrated in phantom), and the processing system may proceed as described above to store the results of performing the task, before ending in step 324.

It should be noted that the methods 200 and 300 may be expanded to include additional steps or may be modified to include additional operations, parameters, or scores with respect to the steps outlined above. In addition, although not specifically specified, one or more steps, functions, or operations of the method 200 or the method 300 may include a storing, displaying, and/or outputting step as required for a particular application. In other words, any data, records, fields, and/or intermediate results discussed in the method can be stored, displayed, and/or outputted either on the device executing the method or to another device, as required for a particular application. Furthermore, steps, blocks, functions or operations in FIG. 2 or FIG. 3 that recite a determining operation or involve a decision do not necessarily require that both branches of the determining operation be practiced. In other words, one of the branches of the determining operation can be deemed as an optional step. Furthermore, steps, blocks, functions or operations of the above described method can be combined, separated, and/or performed in a different order from that described above, without departing from the examples of the present disclosure.

The ability to negotiate jobs in an automated workflow may be useful in a variety of scenarios. For instance, an automated system may be configured to wash dishes. A particular machine of the system may pause performance of its task(s) in response to perceived waste (e.g., wastewater being improperly handled or disposed, or more than a threshold amount of wastewater being generated). The machine may request that the dishes be washed as soon as possible after use in order to make removal of food debris easier and therefore use less water (especially when the location at which the dishes are being washed may be subject to drought restrictions).

In another example, multiple disjoint systems may be coordinated to perform a single physical or logical operation or workflow. For instance, several of the multiple systems may be assigned a workflow to "build a house," but each system may modify sub-tasks of its workflow based on its perceptions of the environment, safety, and the like. For instance, an excavation system may not begin work until any necessary permits are confirmed to be secured, while construction and layout systems may not begin work until engineering specifications have provided. Safety systems may be programmed to perform safety inspections before certain tasks can be considered complete.

In another example, a system may be controlled to perform an evaluation of a data model. In this case, a human data scientist may propose use of a specific data model without checking the domain in which the data model is to be used. The system may determine (e.g., via self-check) that the domain has drifted too much to apply the proposed data model and may reject the proposal (optionally including reasoning as to why the proposal is rejected).

Figure 4:
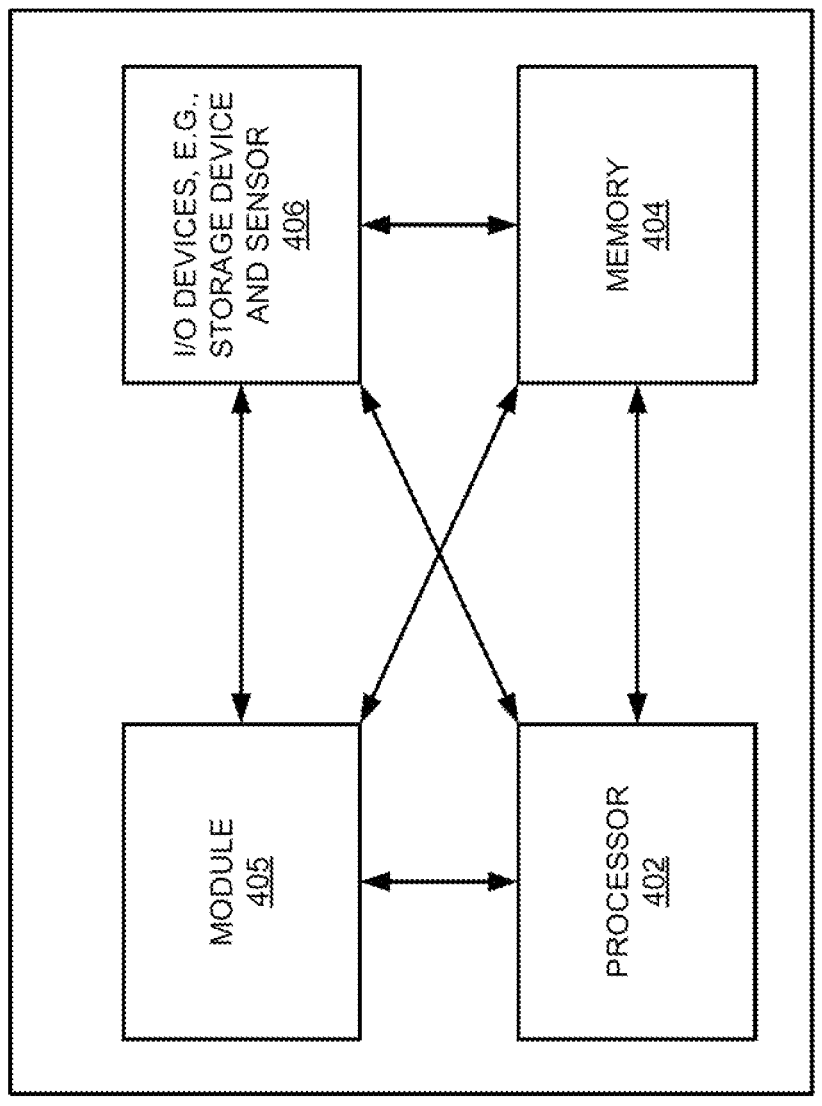
FIG. 4 illustrates an example of a computing device, or computing system, specifically programmed to perform the steps, functions, blocks, and/or operations described herein.

FIG. 4 depicts a high-level block diagram of a computing device or processing system specifically programmed to perform the functions described herein. As depicted in FIG. 4, the processing system 400 comprises one or more hardware processor elements 402 (e.g., a central processing unit (CPU), a microprocessor, or a multi-core processor), a memory 404 (e.g., random access memory (RAM) and/or read only memory (ROM)), a module 405 for job negotiation for workflow automation tasks, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 or the method 300 as discussed above is implemented in a distributed or parallel manner for a particular illustrative example, i.e., the steps of the above method 200 or 300 or the entire method 200 or 300 is implemented across multiple or parallel computing devices, e.g., a processing system, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200 or method 300. In one example, instructions and data for the present module or process 405 for job negotiation for workflow automation tasks (e.g., a software program comprising computer-executable instructions) can be loaded into memory 404 and executed by hardware processor element 402 to implement the steps, functions, or operations as discussed above in connection with the illustrative method 200 or method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 405 for job negotiation for workflow automation tasks (including associated data structures) of the present disclosure can be stored on a tangible or physical (broadly non-transitory) computer-readable storage device or medium, e.g., volatile memory, nonvolatile memory, ROM memory, RAM memory, magnetic or optical drive, device or diskette, and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of illustration only, and not a limitation. Thus, the breadth and scope of any aspect of the present disclosure should not be limited by any of the above-described examples, but should be defined only in accordance with the following claims and their equivalents.

What is claimed is:

1. A method comprising:

receiving, by a processing system including at least one processor, a delegation of a task from a controller, wherein the task is one of a plurality of tasks that collectively forms a workflow;

assessing, by the processing system, an ability of the processing system to perform the task as defined in the delegation;

suggesting, by the processing system, a modification to the task as defined in the delegation, wherein the modification comprises a redelegation of the task to another processing system or machine;

determining, by the processing system, whether the modification was accepted by the controller;

declining, by the processing system, the task when the modification is not accepted by the controller; and performing, by the processing system, the modification when the modification is accepted by the controller.

2. The method of claim 1, wherein the workflow is a partially automated workflow.

3. The method of claim 1, wherein the workflow is a fully automated workflow.

4. The method of claim 1, wherein the assessing comprises determining whether the processing system has access to at least one of: hardware necessary to perform the task as defined in the delegation and software necessary to perform the task as defined in the delegation.

5. The method of claim 1, wherein the assessing comprises determining whether the processing system is able to perform the task as defined in the delegation, including satisfying a condition imposed on a performance of the task.

6. The method of claim 5, wherein the condition relates to a timeframe within which the task must be performed.

7. The method of claim 5, wherein the modification further comprises a modification to the condition.

8. The method of claim 1, wherein the assessing comprises determine whether a status of the processing system will allow the processing system to perform the task as defined.

9. The method of claim 1, wherein the assessing comprises determine whether an environment of the processing system will allow the processing system to perform the task as defined.

10. The method of claim 1, wherein the assessing is performed using a machine learning model that is trained to take as an input the task as defined and to generate as an output a likelihood that the processing system is able to perform the task as defined, and wherein the machine learning model is trained using data about past tasks performed by the processing system.

11. The method of claim 1, wherein the assessing is performed in accordance with a risk/reward function.

12. The method of claim 1, wherein the processing system is part of a pool of machines available to the controller for performing the plurality of tasks.

13. The method of claim 1, further comprising:

storing, by the processing system, a result of performing the task or the modification.

14. The method of claim 13, wherein the result is used by the processing system to assess an ability of the processing system to perform a subsequent task defined in a subsequent delegation by the controller.

15. The method of claim 14, wherein the result is used to generate a simulation that shows a probable outcome of performing the subsequent task.

16. The method of claim 1, wherein the assessing considers a limitation on the processing system that has been pre-programmed by a manufacturer of the processing system, and wherein the limitation causes the processing system to decline tasks of a specified type.

17. The method of claim 1, wherein the assessing considers a dependency associated with the task as defined in the delegation.

18. The method of claim 12, wherein each processing system in pool of machines is associated with a profile that specifies at least one capability of the each processing system.

19. A non-transitory computer-readable medium storing instructions which, when executed by a processing system including at least one processor, cause the processing system to perform operations, the operations comprising:

receiving a delegation of a task from a controller, wherein the task is one of a plurality of tasks that collectively forms a workflow;

assessing an ability of the processing system to perform the task as defined in the delegation;

suggesting a modification to the task as defined in the delegation, wherein the modification comprises a redelegation of the task to another processing system or machine;

determining whether the modification was accepted by the controller;

declining the task when the modification is not accepted by the controller; and performing the modification when the modification is accepted by the controller.

20. A device comprising:

a processing system including at least one processor; and a non-transitory computer-readable medium storing instructions which, when executed by the processing system, cause the processing system to perform operations, the operations comprising:

receiving a delegation of a task from a controller, wherein the task is one of a plurality of tasks that collectively forms a workflow;

assessing an ability of the processing system to perform the task as defined in the delegation;

suggesting a modification to the task as defined in the delegation, wherein the modification comprises a redelegation of the task to another processing system or machine;

determining whether the modification was accepted by the controller;

declining the task when the modification is not accepted by the controller; and performing the modification when the modification is accepted by the controller.

\* \* \* \* \*